(12) United States Patent
Carter et al.

(10) Patent No.: US 9,665,346 B2
(45) Date of Patent: *May 30, 2017

(54) PERFORMING ARITHMETIC OPERATIONS USING BOTH LARGE AND SMALL FLOATING POINT VALUES

(71) Applicant: International Business Machines Corporation, Armonk, NY (US)

(72) Inventors: John B. Carter, Austin, TX (US); Bruce G. Mealey, Austin, TX (US); Karthick Rajamani, Austin, TX (US); Eric E. Retter, Austin, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 9 days.

This patent is subject to a terminal disclaimer.

(21) Appl. No.: 14/525,313

(22) Filed: Oct. 28, 2014

(65) Prior Publication Data

US 2015/0074162 A1 Mar. 12, 2015

Related U.S. Application Data

(63) Continuation of application No. 13/324,025, filed on Dec. 13, 2011, now Pat. No. 8,909,690.

(51) Int. Cl.
*G06F 7/38* (2006.01)
*G06F 7/483* (2006.01)

(52) U.S. Cl.
CPC ........ *G06F 7/483* (2013.01); *G06F 2207/382* (2013.01)

(58) Field of Classification Search
CPC ...... G06F 7/572; G06F 7/49905; G06F 7/483; G06F 9/3001; G06F 7/4876

(Continued)

(56) References Cited

U.S. PATENT DOCUMENTS 6,144,977 A 11/2000 Giangarra et al.
6,941,335 B2 9/2005 Dhong et al.
(Continued)

FOREIGN PATENT DOCUMENTS

CN 101751244 A 6/2010
CN 102243577 A 11/2011
(Continued)

OTHER PUBLICATIONS

International Preliminary Report on Patentability dated Jun. 26, 2014 for International Application No. PCT/JP2012/007479, 5 pages.

(Continued)

*Primary Examiner* — Tan V. Mai
(74) *Attorney, Agent, or Firm* — Stephen J. Walder, Jr.; Thomas E. Tyson

(57) ABSTRACT

Mechanisms are provided for performing a floating point arithmetic operation in a data processing system. A plurality of floating point operands of the floating point arithmetic operation are received and bits in a mantissa of at least one floating point operand of the plurality of floating point operands are shifted. One or more bits of the mantissa that are shifted outside a range of bits of the mantissa of at least one floating point operand are stored and a vector value is generated based on the stored one or more bits of the mantissa that are shifted outside of the range of bits of the mantissa of the at least one floating point operand. A resultant value is generated for the floating point arithmetic operation based on the vector value and the plurality of floating point operands.

25 Claims, 4 Drawing Sheets

(58) Field of Classification Search
USPC .......................................... 708/209, 495–514
See application file for complete search history.

(56) References Cited

U.S. PATENT DOCUMENTS

| | | |
|---|---|---|
| 7,228,324 B2 | 6/2007 | Steele, Jr. |
| 7,366,749 B2 | 4/2008 | Steele, Jr. |
| 2006/0206556 A1 | 9/2006 | Lutz et al. |
| 2008/0183791 A1 | 7/2008 | Ho et al. |
| 2010/0057467 A1 | 3/2010 | Wouters |
| 2013/0151577 A1 | 6/2013 | Carter et al. |
| 2013/0151578 A1 | 6/2013 | Carter et al. |

FOREIGN PATENT DOCUMENTS

| | | | |
|---|---|---|---|
| JP | 62038937 A | 2/1987 | |
| JP | 63298435 A | 12/1988 | |

OTHER PUBLICATIONS

International Search Report and Written Opinion dated Dec. 18, 2012 for International Application No. PCT/JP2012/007479, 7 pages.
U.S. Appl. No. 13/324,025.
U.S. Appl. No. 13/598,847.

PERFORMING ARITHMETIC OPERATIONS USING BOTH LARGE AND SMALL FLOATING POINT VALUES

This application is a continuation of application Ser. No. 13/324,025, filed Dec. 13, 2011, status allowed.

BACKGROUND

The present application relates generally to an improved data processing apparatus and method and more specifically to mechanisms for performing arithmetic operations using both large and small floating point values.

The term "floating point" refers to a method of representing real numbers in a way that can support a wide range of values. With a floating point format, numbers are generally represented approximately by a fixed number of significant digits and are scaled using base value and corresponding exponent. The base for the scaling is normally 2, 10, or 16, but can be any base value suitable to the particular implementation. The typical number that can be represented exactly is of the form: significant digits×base$^{exponent}$, e.g., $1.34 \times 2^{10}$. Within computing systems, such floating point formatted values comprise a significant bits portion (or mantissa portion) that represents the significant digits of the floating point value, and an exponent bits portion that represents the exponent portion of the floating point value, with the base value being assumed to be consistent within the computer system architecture, e.g., base of 2. Thus, floating point format provides the ability to represent a wide range of values that can range from relatively very large values to relatively very small values.

SUMMARY

In one illustrative embodiment, a method, in a data processing system, is provided for performing a floating point arithmetic operation. The method comprises receiving, in hardware logic of the data processing system, a plurality of floating point operands of the floating point arithmetic operation. The method further comprises shifting, by the hardware logic, bits in a mantissa of at least one floating point operand of the plurality of floating point operands. Moreover, the method comprises storing, by the hardware logic, one or more bits of the mantissa that are shifted outside a range of bits of the mantissa of the at least one floating point operand. In addition, the method comprises generating, by the hardware logic, a vector value based on the stored one or more bits of the mantissa that are shifted outside the range of bits of the significant of the at least one floating point operand. Furthermore, the method comprises generating, by the hardware logic, a resultant value for the floating point arithmetic operation based on the vector value and the plurality of floating point operands.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 illustrates an example of a floating point addition operation;

DETAILED DESCRIPTION

Figure 2:
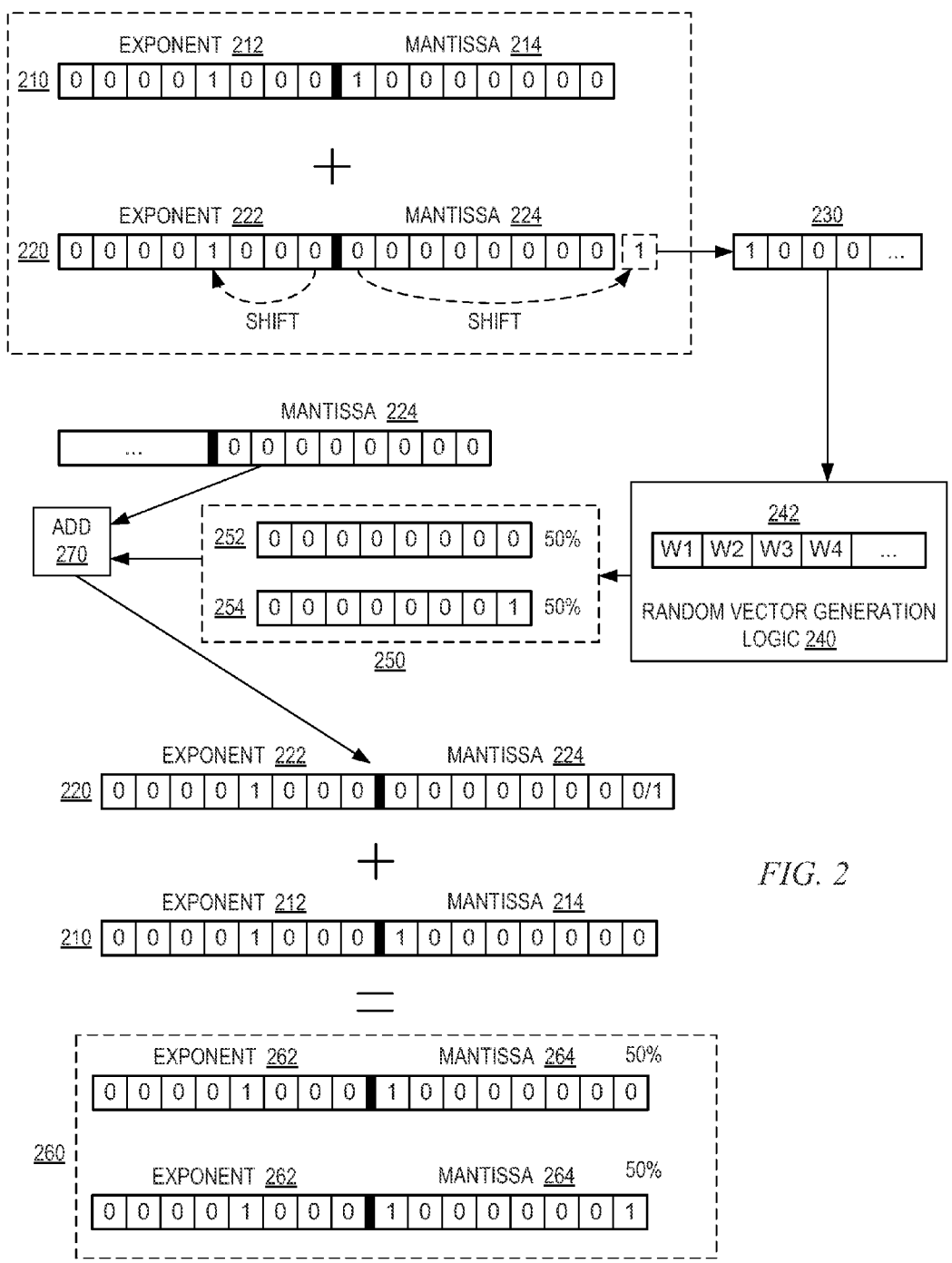
FIG. 2 is an example block diagram illustrating a floating point addition operation in accordance with one illustrative embodiment.

The illustrative embodiments provide mechanisms for performing arithmetic operations using both large and small floating point values. In one illustrative embodiment, the mechanisms of the illustrative embodiments are applied to addition operations where two or more floating point values, each represented as significant and exponent bits, are added together to generate a resultant floating point value. The mechanisms of the illustrative embodiments provide an ability to accumulate bits below the mantissa with probabilistic weights, e.g., one position out of range of the mantissa is accumulated ½ of the time, two positions out of range of the mantissa is accumulated ¼ of the time, etc. While the illustrative embodiments will be described with regard to a floating point addition operation, it should be appreciated that the illustrative embodiments may be utilized with any type of floating point arithmetic operation including subtraction, division, multiplication, and the like.

Floating point representations of values in computer systems are basically approximations of the actual value. For example, one can represent the value of ⅓ using floating point values corresponding to 0.3 ($3 \times 10^{-1}$), 0.33, 0.333, etc., and while this can be extended to an infinite amount of decimal digits to get an increasingly better approximation of the value of ⅓, the floating point value will never exactly equal ⅓, i.e. it is an approximation. In a similar way, computer system architectures place a limit on the number of significant digits and exponent digits that may be represented in the computer system architecture. This, in addition to the fact that some numbers simply cannot be exactly represented due to the base value used by the floating point representation (e.g., the value ⅓ cannot be exactly represented by a base-2 floating point format), leads to the floating point representation being an approximation of real numbers.

With floating point value arithmetic, in order to perform an arithmetic operation the operands must be adjusted so that they have consistent exponent values among the operands of the arithmetic operation. This is similar to scientific notation arithmetic operations where the values must likewise be adjusted to make the exponents the same for each of the values. For example, in scientific notation, when adding the values 1.58e1 and 3.45e0, the value 3.45e0 needs to be adjusted to the value 0.345e1 and then added to the value 1.58e1. This results in the value 1.925e1. The same is true for floating point arithmetic in computing systems where the significant and exponent bits must be shifted so that the operands have the same exponent and the arithmetic operation can be performed.

In floating point arithmetic, since floating point values may be used to represent both very large values and very small values, it can often be the case that relatively small floating point values are combined with relatively large floating point values. In such cases, small floating point values are often lost due to rounding when they are added to large floating point values. This is due to the nature of floating point values being approximations and the need to shift mantissa and exponent bits to make the exponent values the same for the operands to facilitate the arithmetic operation.

Figure 1:
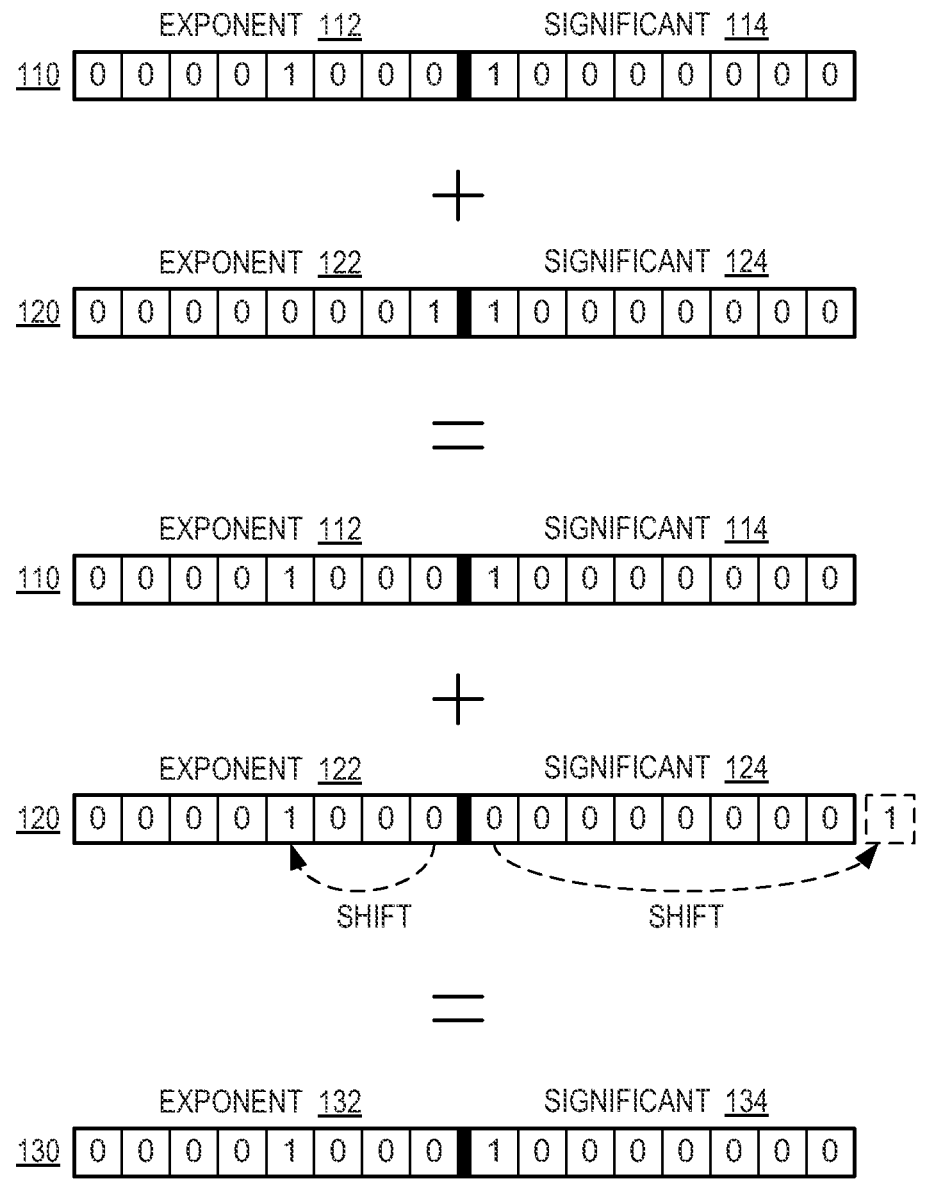

For example, FIG. 1 illustrates an example of a floating point addition operation. As shown in FIG. 1, each of the operands 110 and 120 are provided in a floating point format comprising an exponent portion 112, 122 and mantissa portion 114, 124. In some computing system architectures, the floating point values 110 and 120 may further comprise a sign bit (not shown). Furthermore, in some computing system architectures, rather than having 8 bits for each of the exponent and mantissa as shown in FIG. 1, other numbers of bits may be used for the exponent and mantissa, which may or may not be the same for each, i.e. the number of bits for the exponent may be the same or different from the number of bits for the mantissa.

The first floating point value 110 has the fourth exponent bit in the exponent portion 112 set to 1 while the remaining bits are set to 0 and the eighth bit of the mantissa portion 114 set to 1 while the remaining bits are set to 0. This corresponds to a value of $128*2^8=128*256=32,768$. The second floating point value 110 has a value of $128*2^0=128$. In order to be able to add the relatively large value of the first floating point value 110 to the relatively small value of the second floating point value 120, the exponent portion 122 and mantissa portion 124 of the second floating point value 120 need to be adjusted to make the exponent portion 122 the same as the exponent portion 112 for the first floating point value 110. This involves shifting the exponent bits of the exponent portion 122 and the mantissa bits of the mantissa portion 124 to adjust the value accordingly, as shown in FIG. 1 as floating point value 130. That is, the bits of the exponent portion 122 are shifted left and to offset the shifting of the exponent bits left, the mantissa bits in the mantissa portion 124 are shifted right.

As shown in FIG. 1, in some cases, the shifting of the bits in the exponent portion 122 and the mantissa portion 124 may cause bits of the mantissa to be shifted beyond the number of mantissa bits supported by the computing system architecture, i.e. the rounding of floating point values. In other words, the value of the second floating point value 120 is relatively so much smaller than the first floating point value 110, that it is relatively insignificant both due to the approximation nature of the floating point value and the limit on the number of bits that the computing system architecture facilitates. That is, the most significant bit of the smaller floating point value 120 is of a lower magnitude than the least significant bit of the larger gloating point value 110.

As a result, such smaller floating point values in essence disappear and are ignored in such floating point arithmetic operations and the result is simply the larger floating point value 140.

For some applications/functions that use floating point arithmetic operations, such rounding errors or approximations are acceptable, i.e. the loss in precision is not significant. In other applications, however, such rounding errors or approximations can negatively impact the proper operation of the application or computing system functionality, e.g., functionality or applications that accumulate small values such as event counts and statistics may not be able to accommodate such rounding errors or approximations without negatively affecting functionality.

For example, in many computer system architectures, memory optimization functions/algorithms may require counting the memory activity for each region of memory. Examples of such memory optimization functions/algorithms include memory page replacement algorithms, tiered memory support structures, and the like. Such memory optimization functions/algorithms require a broad dynamic range of floating point values with low storage overhead since counter(s) are required for each page of main memory. As a result, these counter(s) utilize floating point arithmetic operations, implemented in hardware, software, or a combination of hardware and software, that suffer from the issues of floating point arithmetic operations discussed above. However, the resulting loss in accuracy is not acceptable when accumulating counter values in this way, since it is important to have an accurate measure of memory page activity in order to perform the various memory optimization operations.

The illustrative embodiments provide mechanisms for compensating for the loss of small floating point values during floating point arithmetic operations, e.g., the rounding performed as a consequence of the shifting of floating point value mantissa bits. With the mechanisms of the illustrative embodiments, functionality is provided for accumulating bits below the combined mantissa's least significant bit with probabilistic weights. That is, each bit position below the least significant bit of the mantissa has an associated probabilistic weight that causes a value to be added to the mantissa every x number of arithmetic operations, where x is an integer value determined based on the probabilistic weight. For example, for a bit position immediately below the least significant bit, a value in this bit position is accumulated in the mantissa once every 2 operations, or for half of the floating point arithmetic operations. For a bit position two bits outside of the range of the combined mantissa, a value in this bit position is accumulated in the mantissa once every 4 operations, or for one quarter of the floating point arithmetic operations. This continues for each of the bit positions outside of the combined mantissa's significant bit range up to a maximum number of bit positions outside of the mantissa.

To implement this functionality, logic is provided that generates a pseudo-random vector with a maximum width of the architecture's support mantissa. Each bit in the randomly generated vector is generated from a pseudo-random number generator with the appropriate probability distribution corresponding to the bit position outside the mantissa range in which the values are present after shifting of the mantissa of the smaller floating point operand to adjust the exponent values to match that of the larger operand. The pseudo-randomly generated vector is added with the actual mantissa of the operand that was subjected to the shifting of its mantissa. The resulting bit vector is then summed into the normal resulting mantissa in a normal fashion using a floating point arithmetic operation.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 2 is an example block diagram illustrating a floating point addition operation in accordance with one illustrative embodiment. The example shown in FIG. 2 uses the same type of operands as shown in FIG. 1 in order to illustrate the additional mechanisms of the illustrative embodiments, however the illustrative embodiments are not limited to such. As shown in FIG. 2, when shifting the significant bits in the mantissa 224 and exponent bits in the exponent 222 of the second operand 220, the significant bit is shifted outside the range of mantissa 220, in this case to the next lower bit below the least significant bit of the mantissa 224. As shown in FIG. 2, this shifting outside of the range of the mantissa 224 is tracked, or stored, by a separate register 230 that indicates which bits outside the range of the significant 220 have their bit values set to 1. Probabilistic weights 242, present in the random vector generation logic 240, are associated with each of the bit positions in the register 230.

The weights 242 cause the resulting pseudo-randomly generated vector value 250 to have a least significant bit to be set every x number of floating point arithmetic operations. For example, weight W1 of the weights 242, corresponding to bit position 1 of the register 230, may be set to 50% such that 50% of the time that this bit in register 230 is set, the random vector generation logic 240 will generate a pseudo-randomly generated vector value 250 that has the least significant bit set to 1 (vector 254) and 50% of the time the random vector generation logic 240 will generate a pseudo-randomly generated vector value 250 that has the least significant bit set to 0 (vector 252).

Other weights W2, W3, W4, etc., may be associated with different bits of the separate register 230 that tracks the values of the shifted bits outside the range of the significant 224, e.g., lower than the least significant bit of the mantissa 224. For example, these weights W1-W4 correspond to the fractional part of a real number to which the bits below the least significant bit of the mantissa correspond. Thus, the first bit of register 230 corresponds to a value 0.5, or 50%. The second bit of register 230 corresponds to a value of 0.25, or 25%, the third bit of register 230 corresponds to a value of 0.125, or 12.5%, etc. Thus, for example, the weight W1 may correspond to 50%, the weight W2 may correspond to 25%, the weight W3 may correspond to 12.5%, the weight W4 may correspond to 6.25%, and the like.

The random vector generation logic 240 receives the vector 230 as input and pseudo-randomly generates the pseudo-random vector value 250 for addition to the significant 224 of the operand register 220. The pseudo-random generation of the pseudo-random vector value 250 is performed based on the probabilistic weighting 242 corresponding to the bits set in the input vector 230. In the depicted example, the first bit of the input vector 230 is set which corresponds to a weight W1 of 50%. Thus, there is a 50% probability that the random vector generation logic 240 will generate a pseudo-randomly generated vector value 250 whose least significant bit is set to 1 (vector value 254); otherwise the pseudo-randomly generated vector value 250 will have a least significant bit set to 0 (vector value 252). Each bit in the pseudo-randomly generated vector value 250 can be set (i.e. have a valid state), and may be added in the column to generate the correct mode bit. Different weightings may be used depending on the particular bits set in the register 230.

The pseudo-randomly generated vector value 250 (either 252 or 254) is added, by ADD logic 270, with the mantissa 224 of the shifted operand 220, the result of which is then added with the larger value operand 210 to generate a resultant floating point value stored in a resultant register 260. Because, in the example shown in FIG. 2, the weight is 50%, 50% of the time the first vector value 252 is added, by ADD logic 270, with the mantissa 224 and the other 50% of the time the second vector value 254 is added, by ADD logic 270, with the mantissa 224. As a result, 50% of the time, the first resultant value 260 is generated, and the other 50% of the time the second resultant value 260 is generated.

With the mechanisms of the illustrative embodiments as described above, the pseudo-randomly generated vector value in the vector register 250 approximates the relatively small floating point value that would otherwise be ignored by the floating point arithmetic operation. Through the use of the illustrative embodiments in which the same floating point arithmetic operation is performed a plurality of times using the same or similar operands, the pseudo-randomly generated vector value in which the pseudo-randomly generated vector value is generated in accordance with probabilistic weights associated with the bit positions outside the range of the mantissa, into which bit values are shifted by a shift operation for aligning the exponents of the operands, approximate the relatively small floating point value. As a result, a more accurate resultant value is generated in the resultant vector 260 that takes into consideration the relatively small floating point value being added to the relatively large floating point value, rather than ignoring of discarding the relatively small floating point value.

The separate register 230, random vector generation logic 240, pseudo-randomly generated vector value register 250, and ADD logic 270, as well as the other hardware and/or software logic used to implement a floating point arithmetic operation in accordance with the illustrative embodiments, may be implemented in one or more functional units, memory controllers, or the like, of a hardware implemented processor, or software application executing on a hardware implemented processor. In one illustrative embodiment, for example, the various elements for implementing the functionality of the illustrative embodiments may be implemented in hardware and/or software logic of a memory controller of a hardware implemented processor of a data processing system. In other illustrative embodiments, the various elements for implementing the functionality of the illustrative embodiments may be implemented in hardware and/or software logic of a floating point unit of the hardware implemented processor of a data processing system. Of course the illustrative embodiments may be implemented in more than one functional unit, a functional unit and a memory controller, in more than one memory controller, or the like.

In one illustrative embodiment in which the mechanisms of the illustrative embodiments are implemented in a memory controller, the mechanisms of the illustrative embodiments may be utilized with counter logic for counting memory operations for a region of memory in the data processing system. For example, there may be a floating point counter implemented in hardware/software for each page of main system memory. The mechanisms of the illustrative embodiments may be implemented with each of these floating point counters to ensure proper accumulation of counts of memory operations by taking into account the addition of a small floating point value, indicative of a current number of memory operations, to a relatively large floating point value that represents the total of the accumulation.

It should be appreciated that while one illustrative embodiment is directed to accumulating statistics for memory operations targeting regions of memory, the illustrative embodiments are not limited to such and instead, the mechanisms of the illustrative embodiments may be applied to any floating point arithmetic operation. Furthermore, the illustrative embodiments are not limited to floating point addition, but may also be applied to floating point subtraction operations, floating point division operations, floating point multiplication operations, any combination of these types of operations, and other types of floating point arithmetic operations.

Figure 3:
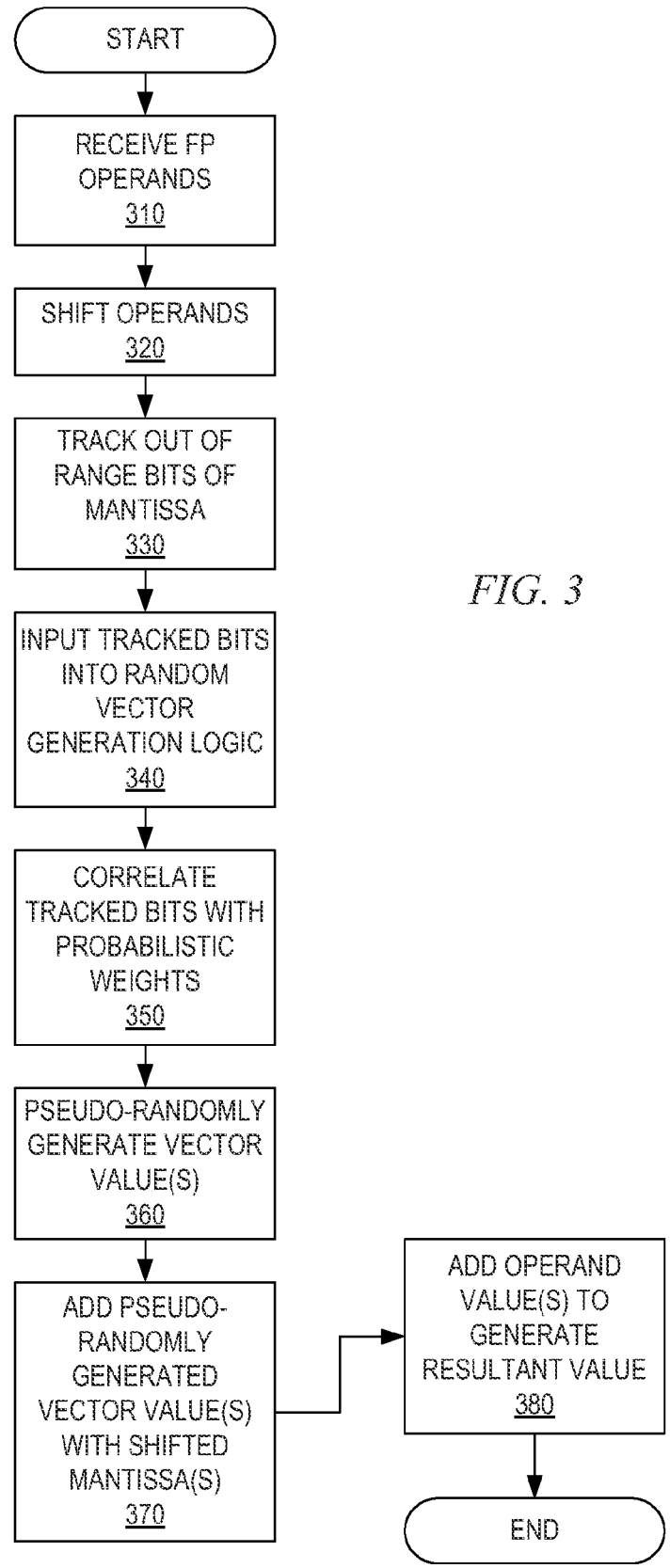
FIG. 3 is a flowchart outlining an example floating point arithmetic operation for performing floating point addition in accordance with one illustrative embodiment.

FIG. 3 is a flowchart outlining an example floating point arithmetic operation for performing floating point addition in accordance with one illustrative embodiment. For ease of explanation, it will be assumed that there are only two operands involved in the floating point addition operation. However it should be appreciated that the operation outlined in FIG. 3 can be applied to any number of floating point operands with the mechanisms of the illustrative embodiments for taking into account the shifting of bits outside a range of a mantissa being applied to any operand in which such shifting outside the range of the mantissa of the operand occurs.

As shown in FIG. 3, the operation starts by receiving two floating point operands for the floating point addition operation (step 310). The bits in the floating point operands are shifted to align the exponent values of the floating point operands (step 320). Any bits shifted out of the range of the mantissa are tracked with a corresponding separate tracking register (step 330). The bits of the corresponding tracking register(s) are input to the random vector generation logic (step 340) which correlates the set bits in the tracking register(s) with corresponding probabilistic weights (step 350). For each of the input tracking register(s) having set bits, the identified probabilistic weights are used with a pseudo-random vector generation logic function to generate a pseudo-random vector value (step 360). The resulting pseudo-randomly generated vector value(s) are added with the shifted mantissa of the correspondingly shifted operand (step 370). The resulting added operand values are added to generate a resultant value (step 380) and the operation terminates.

Figure 4:
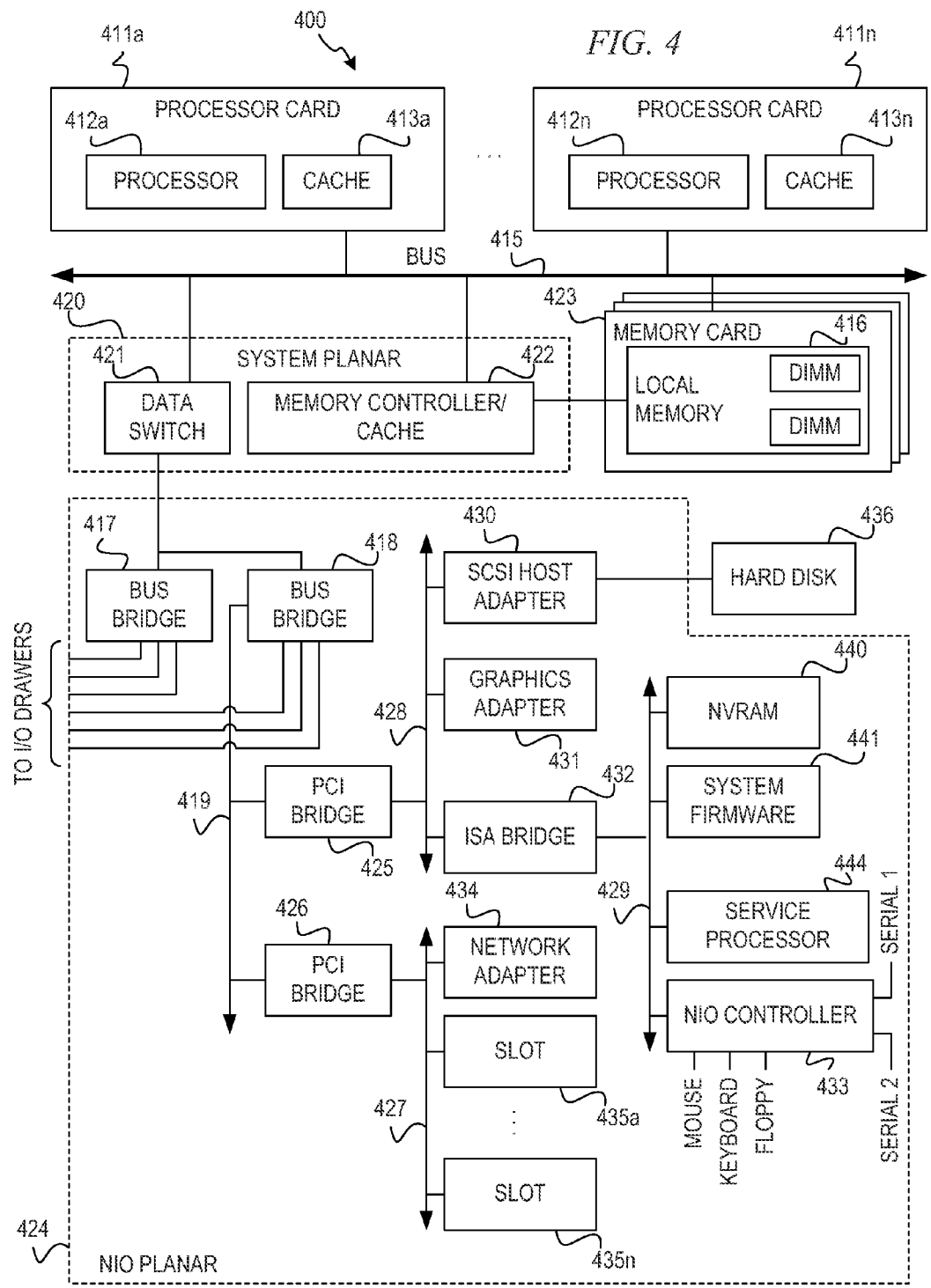
FIG. 4 is an example block diagram of one example data processing system in which aspects of the illustrative embodiments may be implemented.

FIG. 4 is an example block diagram of one example data processing system in which aspects of the illustrative embodiments may be implemented. FIG. 4 is only an example of one type of data processing system in which aspects of the illustrative embodiments may be implemented and is not intended to state or imply any limitation with regard to the types of data processing systems, configurations, or architectures with which the illustrative embodiments may be implemented. Many modifications to the data processing system may be made without departing from the spirit and scope of the illustrative embodiments.

As shown, data processing system 400 includes processor cards 411a-411n. Each of processor cards 411a-411n includes a processor and a cache memory. For example, processor card 411a contains processor 412a and cache memory 413a, and processor card 411n contains processor 412n and cache memory 413n.

Processor cards 411a-411n are connected to main bus 415. Main bus 415 supports a system planar 420 that contains processor cards 411a-411n and memory cards 423. The system planar also contains data switch 421 and memory controller/cache 422. Memory controller/cache 422 supports memory cards 423 that include local memory 416 having multiple dual in-line memory modules (DIMMs).

Data switch 421 connects to bus bridge 417 and bus bridge 418 located within a native I/O (NIO) planar 424. As shown, bus bridge 418 connects to peripheral components interconnect (PCI) bridges 425 and 426 via system bus 419. PCI bridge 425 connects to a variety of I/O devices via PCI bus 428. As shown, hard disk 436 may be connected to PCI bus 428 via small computer system interface (SCSI) host adapter 430. A graphics adapter 431 may be directly or indirectly connected to PCI bus 428. PCI bridge 426 provides connections for external data streams through network adapter 434 and adapter card slots 435a-435n via PCI bus 427.

An industry standard architecture (ISA) bus 429 connects to PCI bus 428 via ISA bridge 432. ISA bridge 432 provides interconnection capabilities through NIO controller 433 having serial connections Serial 1 and Serial 2. A floppy drive connection, keyboard connection, and mouse connection are provided by NIO controller 433 to allow data processing system 400 to accept data input from a user via a corresponding input device. In addition, non-volatile RAM (NVRAM) 440 provides a non-volatile memory for preserving certain types of data from system disruptions or system failures, such as power supply problems. A system firmware 441 is also connected to ISA bus 429 for implementing the initial Basic Input/Output System (BIOS) functions. A service processor 444 connects to ISA bus 429 to provide functionality for system diagnostics or system servicing.

The operating system (OS) is stored on hard disk 436, which may also provide storage for additional application software for execution by data processing system. NVRAM 440 is used to store system variables and error information for field replaceable unit (FRU) isolation. During system startup, the bootstrap program loads the operating system and initiates execution of the operating system. To load the operating system, the bootstrap program first locates an operating system kernel type from hard disk 436, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

With regard to the mechanisms of the illustrative embodiments, the floating point arithmetic logic of the illustrative embodiments may be implemented in various ones of the elements shown in FIG. 4. For example, the floating point arithmetic logic may be implemented in one or more of the processors 112a-112n, the memory controller 122, system firmware 141, service processor 144, or any of the other elements of FIG. 4, or combination of elements in FIG. 4. In short, any element in FIG. 4 that may perform floating point arithmetic operations may make use of the mechanisms of the illustrative embodiments, which may be implemented in hardware logic, software logic, or any combination of hardware and/or software logic.

As mentioned above, the illustrative embodiment may be embodied in a variety of data processing systems utilizing a number of different hardware configurations and software such as bootstrap programs and operating systems. The data processing system 400 may be, for example, a stand-alone system or part of a network such as a local-area network (LAN) or a wide-area network (WAN).

Thus, the illustrative embodiments provide mechanisms for performing floating point arithmetic operations using relatively large and small floating point values. The illustrative embodiments provide mechanisms for approximating the small floating point values in such a way that they are not ignored or discarded by taken into consideration during the floating point arithmetic operation based on probabilistic weights associated with bit positions of a tracking register that tracks the shifting of significant bits beyond a range of bits of the mantissa. As a result, a more accurate result of a floating point arithmetic operation is achieved using the mechanisms of the illustrative embodiments.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing a floating point arithmetic operation, comprising:
   receiving, in hardware logic of the data processing system, a plurality of floating point operands of the floating point arithmetic operation;
   shifting, by the hardware logic, bits in a mantissa of at least one floating point operand of the plurality of floating point operands;
   storing, by the hardware logic, one or more bits of the mantissa that are shifted outside a range of bits of the mantissa of the at least one floating point operand;
   associating, by the hardware, a probability weight with each of the one or more shifted bits of the mantissa that are shifted outside the range of the bits of the mantissa of the at least one floating point operand; and
   generating, by the hardware logic, a resultant value for the floating point arithmetic operation based on the plurality of floating point operands and the probability weight associated with each of the one or more shifted bits.

2. The method of claim 1, wherein the floating point arithmetic operation is an addition operation for adding two floating point numbers.

3. The method of claim 1, wherein the floating point arithmetic operation is one of a subtraction operation, a division operation, or a multiplication operation.

4. The method of claim 1, wherein the floating point arithmetic operation updates a counter for counting memory activities to a region of memory of the data processing system, and wherein the counter is used as part of a memory optimization algorithm for optimizing utilization of the memory of the data processing system.

5. The method of claim 1, wherein storing one or more bits of the mantissa that are shifted outside a range of bits of the mantissa of the at least one floating point operand comprises setting bits in bit positions of a separate register corresponding to the one or more bits of the mantissa shifted outside the range of bits of the mantissa.

6. The method of claim 5, wherein each bit position in the separate register has a different associated probability weight, the method further comprising:
   generating a vector value based on bit positions of the one or more bits of the mantissa that are shifted outside the range of bits of the mantissa of the at least one floating point operand and probability weights associated with bit positions having corresponding bit values set in the separate register.

7. The method of claim 6, wherein each probability weight causes a value to be added to the shifted mantissa of the shifted floating point operand during the arithmetic operation every x number of arithmetic operations, where x is an integer value corresponding to the probability weight.

8. The method of claim 7, wherein a first bit position in the separate register has a probability weight of 50% such that the value is added to the shifted mantissa once every 2 arithmetic operations, a second bit position in the separate register has a probability weight of 25% such that the value is added to the shifted mantissa once every 4 arithmetic operations, and a third bit position in the separate register has a probability weight of 12.5% such that the value is added to the shifted mantissa once every 8 arithmetic operations.

9. The method of claim 6, wherein each bit in the vector value is generated using a corresponding pseudo random number generator with a probability distribution corresponding to a probability weight associated with a corresponding bit position in the separate register.

10. The method of claim 1, wherein the method is implemented in hardware logic of at least one of a processor, a memory controller, firmware, or a service processor of the data processing system.

11. An apparatus, comprising:
   hardware logic configured to receive a plurality of floating point operands of a floating point arithmetic operation;
   hardware logic configured to shift bits in a mantissa of at least one floating point operand of the plurality of floating point operands;
   hardware logic configured to store one or more bits of the mantissa that are shifted outside a range of bits of the mantissa of the at least one floating point operand;
   hardware logic configured to associate a probability weight with each of the one or more shifted bits of the mantissa that are shifted outside the range of the bits of the mantissa of the at least one floating point operand; and
   hardware logic configured to generate a resultant value for the floating point arithmetic operation based on the plurality of floating point operands and the probability weight associated with each of the one or more shifted bits.

12. The apparatus of claim 11, wherein the floating point arithmetic operation is an addition operation for adding two floating point numbers.

13. The apparatus of claim 11, wherein the floating point arithmetic operation is one of a subtraction operation, a division operation, or a multiplication operation.

14. The apparatus of claim 11, wherein the floating point arithmetic operation updates a counter for counting memory activities to a region of memory of the data processing system, and wherein the counter is used as part of a memory optimization algorithm for optimizing utilization of the memory of the data processing system.

15. The apparatus of claim 11, wherein the hardware logic configured to store one or more bits of the mantissa that are shifted outside a range of bits of the mantissa of the at least one floating point operand comprises hardware logic configured to set bits in bit positions of a separate register corresponding to the one or more bits of the mantissa shifted outside of the range of bits of the mantissa.

16. The apparatus of claim 15, wherein each bit position in the separate register has a different associated probability weight, further comprising hardware logic configured to generate a vector value based on bit positions of the one or more bits of the mantissa that are shifted outside the range of bits of the mantissa of the at least one floating point operand and probability weights associated with bit positions having corresponding bit values set in the separate register.

17. The apparatus of claim 16, wherein each probability weight causes a value to be added to the shifted mantissa of the shifted floating point operand during the arithmetic operation every x number of arithmetic operations, where x is an integer value corresponding to the probability weight.

18. The apparatus of claim 17, wherein a first bit position in the separate register has a probability weight of 50% such that the value is added to the shifted mantissa once every 2 arithmetic operations, a second bit position in the separate register has a probability weight of 25% such that the value is added to the shifted mantissa once every 4 arithmetic operations, and a third bit position in the separate register has a probability weight of 12.5% such that the value is added to the shifted mantissa once every 8 arithmetic operations.

19. The apparatus of claim 16, wherein each bit in the vector value is generated using a corresponding pseudo random number generator with a probability distribution corresponding to a probability weight associated with a corresponding bit position in the separate register.

20. The apparatus of claim 11, wherein the apparatus is part of one of a processor, a memory controller, firmware, or a service processor of the data processing system.

21. A computer program product comprising a computer readable storage medium having a computer readable program stored therein, wherein the computer readable program, when executed on a computing device, causes the computing device to:
  receive a plurality of floating point operands of a floating point arithmetic operation;
  shift bits in a mantissa of at least one floating point operand of the plurality of floating point operands;
  store one or more bits of the mantissa that are shifted outside a range of bits of the significant of the at least one floating point operand;
  associate a probability weight with each of the one or more shifted bits of the mantissa that are shifted outside the range of the bits of the mantissa of the at least one floating point operand; and
  generate a resultant value for the floating point arithmetic operation based on the plurality of floating point operands and the probability weight associated with each of the one or more shifted bits.

22. The computer program product of claim 21, wherein the floating point arithmetic operation is an addition operation for adding two floating point numbers.

23. The computer program product of claim 21, wherein the floating point arithmetic operation updates a counter for counting memory activities to a region of memory of the computing device, and wherein the counter is used as part of a memory optimization algorithm for optimizing utilization of the memory of the computing device.

24. The computer program product of claim 21, wherein:
  the computer readable program causes the computing device to store one or more bits of the mantissa that are shifted outside of a range of bits of the significant of the at least one floating point operand by setting bits in bit positions of a separate register corresponding to the one or more bits of the mantissa shifted outside of the range of bits of the mantissa,
  each bit position in the separate register has a different associated probability weight, and
  the computer readable program causes the computing device to generate a vector value based on bit positions of the one or more bits of the mantissa that are shifted outside of the range of bits of the mantissa of at least one floating point operand and probability weights associated with bit positions having corresponding bit values set in the separate register.

25. The computer program product of claim 24, wherein each probability weight causes a value to be added to the shifted mantissa of the shifted floating point operand during the arithmetic operation every x number of arithmetic operations, where x is an integer value corresponding to the probability weight.

* * * * *